(12) United States Patent
Berman et al.

(10) Patent No.: US 8,095,432 B1
(45) Date of Patent: Jan. 10, 2012

(54) RECOMMENDATION ENGINE FOR SOCIAL NETWORKS

(75) Inventors: Kristen K. Berman, San Francisco, CA (US); Ravi Subramaniam Iyer, Bangalore (IN); Daniel J. Richardson, Mountain View, CA (US); Anuradha Sameer Rahurkar, San Jose, CA (US); Agila Seetharaman, Milpitas, CA (US)

(73) Assignee: Intuit Inc., Mountain View, CA (US)

( * ) Notice: Subject to any disclaimer, the term of this patent is extended or adjusted under 35 U.S.C. 154(b) by 384 days.

(21) Appl. No.: 12/363,629

(22) Filed: Jan. 30, 2009

(51) Int. Cl.
*G06Q 30/00* (2006.01)
(52) U.S. Cl. .................................................. 705/26.7
(58) Field of Classification Search ................ 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | | |
|---|---|---|---|---|
| 7,254,552 B2 * | 8/2007 | Bezos et al. | ............... | 705/26.44 |
| 7,571,121 B2 * | 8/2009 | Bezos et al. | ............... | 705/26.7 |
| 7,720,720 B1 * | 5/2010 | Sharma et al. | ............... | 705/26.7 |
| 7,720,723 B2 * | 5/2010 | Dicker et al. | ............... | 705/26.8 |
| 7,756,753 B1 * | 7/2010 | McFarland | ............... | 705/26.1 |
| 7,756,756 B1 * | 7/2010 | Lifson | ............... | 705/26.1 |
| 7,831,483 B1 * | 11/2010 | Lifson | ............... | 705/26.8 |
| 7,881,984 B2 * | 2/2011 | Kane, Jr. et al. | ............... | 705/26.7 |
| 7,908,183 B2 * | 3/2011 | Jacobi et al. | ............... | 705/26.7 |
| 7,949,573 B1 * | 5/2011 | Cohen et al. | ............... | 705/26.7 |
| 8,010,418 B1 * | 8/2011 | Lee | ............... | 705/26.7 |
| 2006/0218225 A1 * | 9/2006 | Hee Voon et al. | ............... | 709/201 |
| 2006/0282304 A1 * | 12/2006 | Bedard et al. | ............... | 705/10 |
| 2008/0307053 A1 * | 12/2008 | Mitnick et al. | ............... | 709/205 |
| 2009/0228918 A1 * | 9/2009 | Rolff et al. | ............... | 725/34 |
| 2009/0249451 A1 * | 10/2009 | Su et al. | ............... | 726/5 |
| 2010/0268661 A1 * | 10/2010 | Levy et al. | ............... | 705/347 |
| 2010/0287033 A1 * | 11/2010 | Mathur | ............... | 705/10 |

OTHER PUBLICATIONS

Hugo Liu, et al. "InterestMap: Harvesting Social Network Profiles for Recommendations", Beyond Personalization 2005, Jan. 9, 2005.*
Frank E. Walter et al. "A model of a trust-based recommendation system on a social network", Auton Agent Multi-Agent Syst (2008) 16:57-74.*
William H. Hsu et al. "Collaborative and Structural Recommendation of Friends using Weblog-based Social Network Analysis", Department of Computing and Information Sciences, Kansas State University.*

(Continued)

*Primary Examiner* — Naeem Haq
(74) *Attorney, Agent, or Firm* — Osha • Liang LLP (57) ABSTRACT

A method for making a recommendation, comprising obtaining a plurality of recommendations for a plurality of items from a plurality of members of a social networking utility, ranking the plurality of recommendations based on a relationship proximity of the plurality of members to an inquiring member within the social networking utility, wherein the relationship proximity is closest for friends of the inquiring member, and farthest for strangers to the inquiring member, wherein friends of the inquiring member are within a network of the inquiring member, and strangers of the inquiring member are outside of the network of the inquiring network, performing a search for one of the plurality of items, and displaying the plurality of recommendations associated with one of the plurality of items in an order defined by the ranking.

24 Claims, 6 Drawing Sheets

OTHER PUBLICATIONS

Aaditeshwar Seth et al. "A Social Network Based Approach to Personalized Recommendation of Participatory Media Content", Association for the Advancement of Artifical Intelligence, 2008.*

Ioannis Konstas et al. "On Social Networks and Collaborative Recommendation", 2009, ACM 978-1-60558-483-6/09/07.*

* cited by examiner

RECOMMENDATION ENGINE FOR SOCIAL NETWORKS

BACKGROUND

The Internet has redefined how consumers and businesses interact with each other, providing instant access for consumers to online purchasing, and creating a unique marketing and distribution channel for businesses to reach their audiences. Businesses have been able to increase the effectiveness of targeting customers through the web, however the art and science of reaching target audiences online is still very much in development.

E-commerce (electronic commerce) has empowered consumers with the ability to obtain information on anything for sale online, at anytime, from hundreds of millions of contributors around the world. Existing recommendation systems in online e-commerce portals allow users to research and create recommendations on items and services for sale, restaurants, locations, and so forth. Many of these systems allow for open access; in other words, anyone, anywhere can create content (i.e. a recommendation). Systems for providing recommendations based on relationships to an individual searching for information online have not yet evolved to a mature state. At most, recommendations may take into account relationships that interested parties have with items similarly bought or browsed by other consumers.

Another type of application on the Internet that has recently grown in popularity is the social network. Social networks allow individuals to connect with others through a mapping of relationships, whether they are representations of personal friendships, business relationships, common interests, or other relationships. Social networks have attempted to incorporate e-commerce functionality through targeted and non-targeted advertising systems, but these technologies have not yet developed to their full potential. Social networks are rich in relationship information, but have yet to harness it to empower businesses to connect with individuals, and vice-versa.

SUMMARY

In general, in one aspect, the invention relates to a method for making a recommendation, comprising: obtaining a plurality of recommendations for a plurality of items from a plurality of members of a social networking utility; ranking the plurality of recommendations based on a relationship proximity of the plurality of members to an inquiring member within the social networking utility, wherein the relationship proximity is closest for friends of the inquiring member, and farthest for strangers to the inquiring member, wherein friends of the inquiring member are within the network of the inquiring member, and strangers of the inquiring member are outside of the network of the inquiring network; performing a search for one of the plurality of items; and displaying the plurality of recommendations associated with one of the plurality of items in an order defined by the ranking.

In general, in one aspect, the invention relates to a system for making a recommendation, comprising: a processor; a memory operatively connected to the processor; and a recommendation application resident in memory and configured to: obtain a plurality of recommendations for a plurality of items from a plurality of members of a social networking utility; rank the plurality of recommendations based on a relationship proximity of the plurality of members to an inquiring member within the social networking utility, wherein the relationship proximity is closest for friends of the inquiring member, and farthest for strangers to the inquiring member, wherein friends of the inquiring member are within the network of the inquiring member, and strangers of the inquiring member are outside of the network of the inquiring network; perform a search for one of the plurality of items; and display the plurality of recommendations associated with one of the plurality of items in an order defined by the ranking.

In general, in one aspect, the invention relates to a computer readable medium storing instructions to make a recommendation, the instructions comprising functionality to: obtain a plurality of recommendations for a plurality of items from a plurality of members of a social networking utility; rank the plurality of recommendations based on a relationship proximity of the plurality of members to an inquiring member within the social networking utility, wherein the relationship proximity is closest for friends of the inquiring member, and farthest for strangers to the inquiring member, wherein friends of the inquiring member are within the network of the inquiring member, and strangers of the inquiring member are outside of the network of the inquiring network; perform a search for one of the plurality of items; and display the plurality of recommendations associated with one of the plurality of items in an order defined by the ranking.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for mapping a provider referral network based on claims data. In general, embodiments of the invention provide a system and method for obtaining recommendations on items within a friend network in a social network. Further, embodiments of the invention provide a system and method for providing recommendations on items for purchase in a social network. Further, embodiments of the invention provide a system and method for managing inventory of items for sale in a social network.

Figure 1:
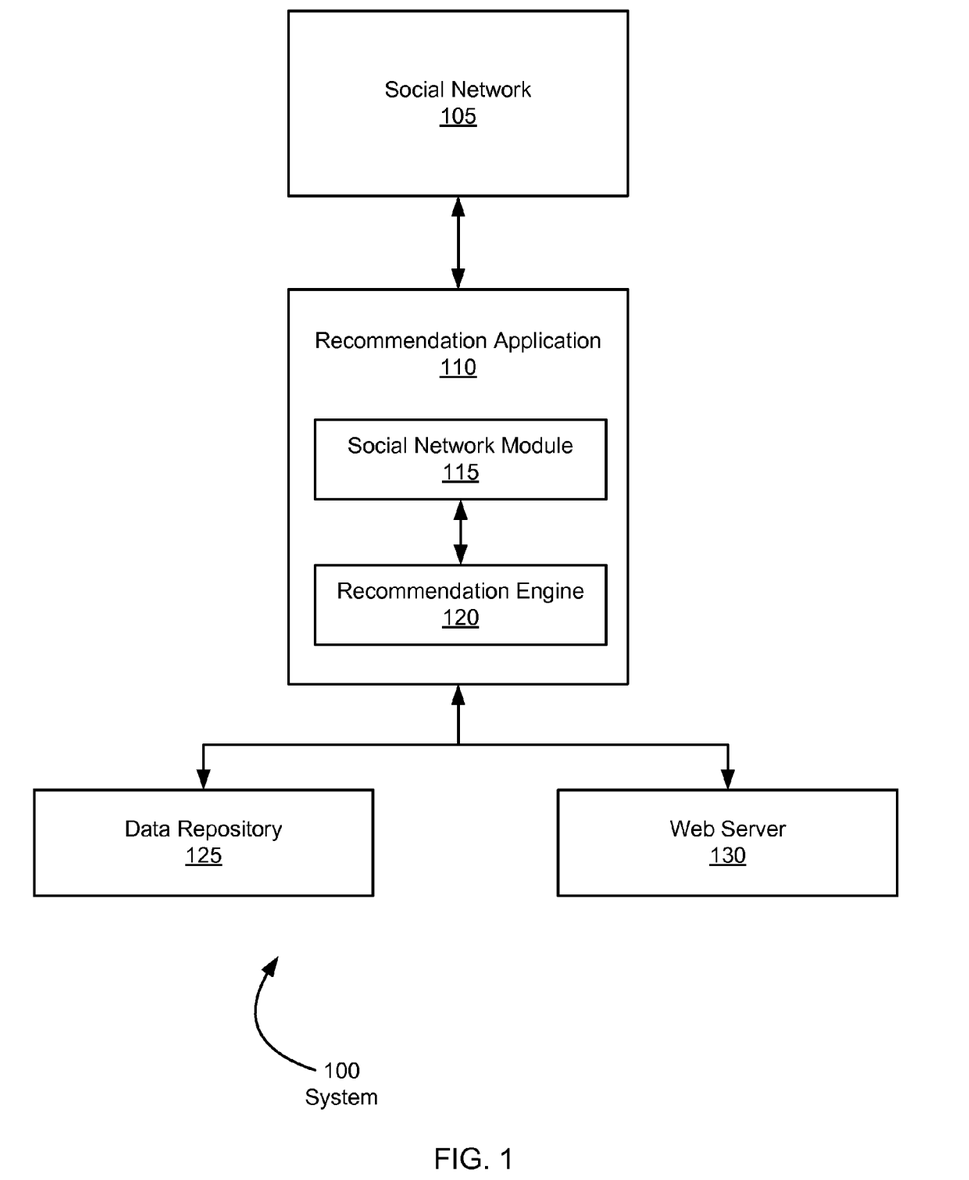
FIG. 1 shows a system in accordance with one or more embodiments of the invention.

FIG. 1 shows a system (100) in accordance with one or more embodiments of the invention. As shown in FIG. 1, the system (100) has multiple components including a recommendation application (110), a data repository (125), a web server (130), and a social network (105) in accordance with one or more embodiments of the invention. These components are described below and may be located on the same device (e.g. a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one recommendation application, data repository, and web server running on a device, as well as more than one social network interfacing with those components.

In one or more embodiments of the invention, a social network (105) is connected to a recommendation application (110), and provides programming hooks for the recommendation application (110) to plug into the social network (105). The social network (105) is a community of connected individuals, with relationships that may be social, professional, or the like. In a social network where individuals are connected by friendships (or other trusted relationship), there may be increased value in recommendations of items from friends over recommendations made by acquaintances or non-friends. When an individual purchases an item online, a recommendation from a trusted friend, especially one that has authority in the subject area at hand (e.g., a snowboarder when purchasing a snowboard, a professor when ordering a textbook), carries more weight than product recommendations from unknown individuals (i.e., individuals that are not friends of an inquiring member or not in a common network) or friends that are not an expert in the subject matter. Additionally, recommendations made by friends carry more (or less—depending on the friend) weight than recommendations made by non-friends that are part of the same network as an inquiring member.

The concept of a ranking of an individual in a social network may also extend to individuals that are indirectly connected through mutual friendships. For example, if an inquiring member (e.g. individual A) is connected to a recommending member (e.g. individual B) through 10 mutual friends, but individual A and individual B are not friends themselves, individual A may still derive benefit from a recommendation from individual B. In this case, the rank of individual B when making a recommendation may be higher than the rank of another individual that is not friends with individual A, and has no mutual friends with individual A. Further, if individual A and another recommending member (e.g. individual C) have 5 mutual friends, and individual A and individual C are not direct friends themselves, the rank of individual C when making a recommendation may be lower than the rank of individual B, from individual A's perspective. Those skilled in the art will appreciate that there will be many other such relationships and rankings associated with a social network (105) and the recommendation network (110).

In one or more embodiments of the invention, a recommendation application (110) contains a social network module (115), and a recommendation engine (120).

In one or more embodiments of the invention, the social network module (115) is configured to connect the recommendation application (110) to the social network (105). This connection is typically accomplished through the use of an application programming interface (API), provided by the social network (105). The social network module (115) may also maintain information (text, images, metadata, or other information) requested by the recommendation engine (120) to provide rapid access to the information when not connected to a network. The social network module (115) may also provide for synchronization of information between the recommendation application (110), the data repository (125), the web server (130), and the social network (105).

In one or more embodiments of the invention, the recommendation engine (120) is configured to obtain input on items for sale in the social network (105) from users of the social network (105), rank the items using the input, and provide recommendations for items based on the rankings. The recommendation application (110) may interact with one or more financial applications (not shown) for managing financial transactions, one or more external social networking utility applications for obtaining recommendations external to the current social network, one or more inventory management applications (not shown) for managing operational systems and merchandise in (or out of) stock, and other similar systems. In one or more embodiments, the recommendation application (110) provides users with motivation and incentive to interact and engage with businesses in a social network environment, as users may now participate in a customized and tailored search for material that is relevant to them and their network of friends and acquaintances. Additionally, the recommendation application (110) provides businesses with incentive to maintain a presence on social networks, as they are provided with a new marketing and sales channel, and a new way to interact with potential customers and partners. Those skilled in the art, having the benefit of this detailed description, will appreciate that there are numerous other reasons and mechanisms for members of a social network and businesses to interact through the recommendation application (110).

In one or more embodiments of the invention, a data repository (125) is configured to contain the data (and other content capable of being stored) associated with providing recommendations on items for sale in the social network (105). The data repository (125) is operatively connected to the recommendation application (110) and the web server (130) to allow for communication between the various component and/or services necessary to accomplish the invention.

In one or more embodiments of the invention, a web server (130) is configured to host the recommendation application (110), including the social network module (115) and/or the recommendation engine (120). The web server may be configured to serve content to users based on requests. Upon receiving a request for a recommendation, for example, the web sever responds to the sender of the request with the data sufficient to satisfy the request or to gather more information necessary to satisfy the request. Those skilled in the art, having the benefit of this detailed description, will appreciate that the web server (130) may be connected to the recommendation application (110) and data repository (125) through numerous network configurations (e.g. wired, wireless, LAN, WAN, and so forth).

Figure 2:
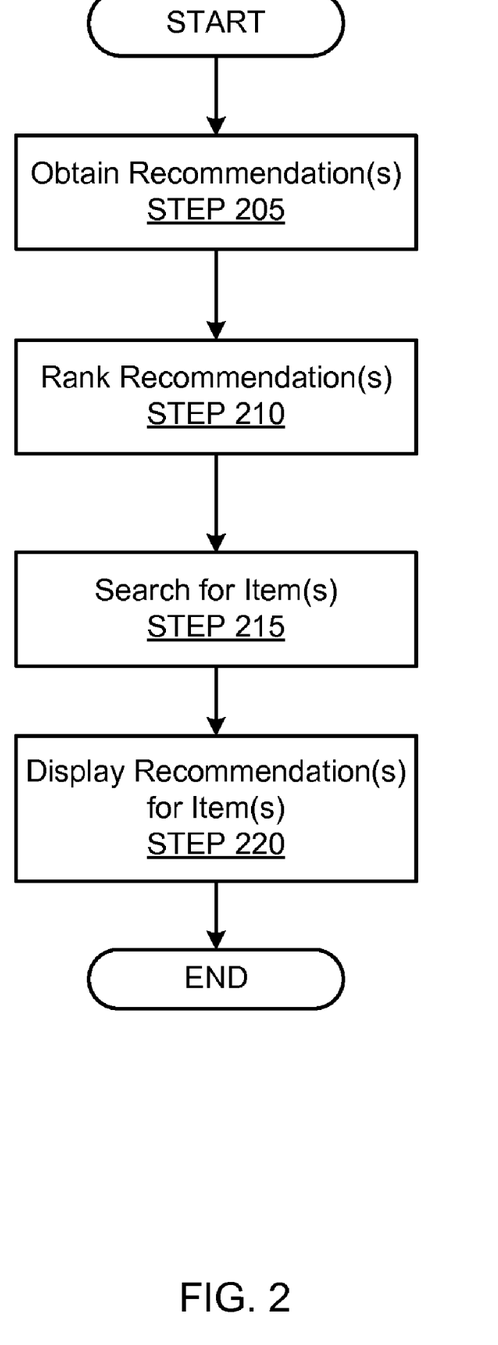
FIGS. 2 and 3 show flowcharts in accordance with one or more embodiments of the invention.

FIG. 2 shows a flowchart in accordance with one or more embodiments of the invention. The process shown in FIG. 2 may be used, for example, with the system (100), to obtain recommendations on items within a friend network in a social network. Those skilled in the art, having the benefit of this detailed description, will appreciate that the sequence of steps shown in FIG. 2 may differ among embodiments of the invention, and that one or more of the steps may be optional.

In STEP 205, recommendations for the item(s) for sale in the social network (105) are obtained and/or stored in accordance with one or more embodiments of the invention. As used herein the item(s) for sale may be a good, a service, an organization, an event, a concept, etc. The recommendation(s) may be obtained from members of a social networking utility (e.g., social network (150) in FIG. 1) or from the general population. Typically, recommendations may be obtained from groups or businesses associated with or interested in the item(s) for sale. By obtaining the data from within the social network, additional tracking and qualifying of the data may be performed. Also, the recommendations are obtained and processed prior to the search for an item.

In STEP 210, the recommendations are ranked in accordance with one or more embodiments of the invention. The ranking may be performed by a recommendation engine (e.g. recommendation engine (120) in FIG. 1), and may be based on the proximity of relationships between the members that provided recommendations and an inquiring member of the social network. The inquiring member and the members that provide relationships may be friends, within a single network, multiple networks, or no common networks. The members that share a common network with the inquiring member may or may not be a "friend" of the inquiring member. Members that do not share a common network with the inquiring member are considered outside of the network of the inquiring member, and do not retain a friend status with the inquiring member. In addition to networks, specific characteristics of individual members may also influence rankings. For example, if a friend of the inquiring member is an avid snowboarder, and has purchased and provided recommendations for numerous snowboarding gear, this member will have a higher seniority of recommendation with regards to snowboarding gear than a member that does not have any experience snowboarding or making recommendations for snowboarding gear.

In STEP 215, a search for an item is performed in accordance with one or more embodiments of the invention. The search may be performed by the inquiring member within the social network. A search for an item may specify search parameters, including item to be searched for (e.g. snowboard), networks to include or exclude from the search (e.g. do not include non-snowboarders in a search for a snowboard), price ranges (e.g. minimum, maximum), type (e.g. professional snowboard), size (e.g. 11), manufacturer (e.g. Burton), and other characteristics that are often specified in a search. A search may also be specified according to friends, categories, tags, and other selection criteria in an effort to limit the scope and results resulting from the search. Alternatively, a random search may be performed. A random search is one performed by an inquiring member that does not specify parameters (such as item name) and allows the member to receive recommendations for random items. The random search may allow users to explore items that they would not have otherwise searched and encourages spontaneity. For example, the member of the social network may simple want all items recommended by other members with trusted relationships (regardless of the item).

In STEP 220, the recommendation(s) for the item(s) searched are displayed in accordance with one or more embodiments of the invention. The recommendation(s) may be displayed within the social network (and display relationships therein) or delivered (with or without relationships noted) in other manners, such as e-mail, text messages, or other messaging method. Further, the recommendations(s) may be displayed in a manner provided by the recommendation engine (120 in FIG. 1) of the recommendation application (110 of FIG. 1). Further, the recommendation(s) displayed may be ordered according to recommendation rank obtained in STEP 210, and there may be the option for the inquiring member to further refine the search and the recommendation list based on additional parameters. The recommendations may be displayed in a manner to allow seamless interaction with the members of the social network and the entities associated with the item searched.

Figure 3:
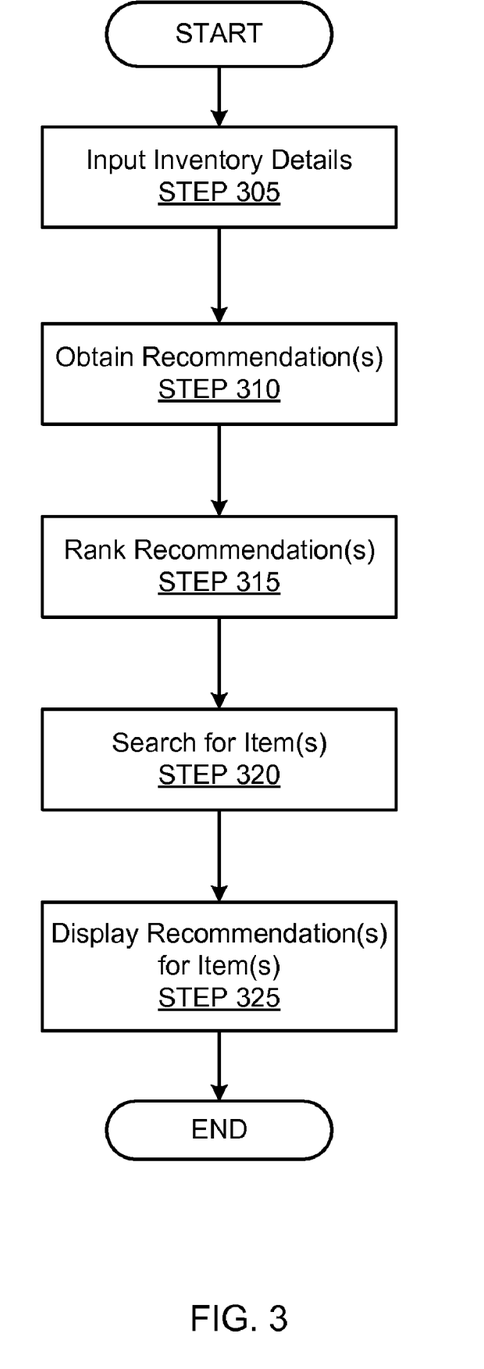

FIG. 3 shows a flowchart of an example of the invention in accordance with one or more embodiments of the invention. The process shown in FIG. 3 may be used, for example, with the system (100), to provide recommendations on items for purchase within a social network. Those skilled in the art, having the benefit of this detailed description, will appreciate that the sequence of steps shown in FIG. 3 may differ among embodiments of the invention, and that one or more of the steps may be optional.

In STEP 305, inventory details are input into an application (e.g. the recommendation application (110 in FIG. 1)) (and eventually into a social network) by a business selling items in accordance with one or more embodiments of the invention. In one or more embodiments of the invention, the inventory details may be imported directly from inventory management system in a periodic manner (hourly, daily, weekly, bi-weekly, monthly) or immediately upon the inventory item being added (or removed) from inventory. Inventory details tracked may include a title of an item, a description of the item, price, cost, quantity, reordering parameters, searchable tags, and the like.

In STEP 310, recommendations are obtained in a manner consistent with STEP 205 of FIG. 2 in accordance with one or more embodiments of the invention. Additionally, recommendations may be obtained from external social networking utility applications that plug into a particular social network, as well as the other applications (e.g., the recommendation application (110 in FIG. 1)) interacting with social networks. In this way, a much wider community of users and recommenders may be involved across multiple social networks.

In STEP 315, the recommendations are ranked in a manner consistent with STEP 210 of FIG. 2 in accordance with one or more embodiments of the invention. In STEP 320, a search for an item is performed in a manner consistent with STEP 215 of FIG. 2 in accordance with one or more embodiments of the invention. Additionally, the provider of the recommendation application may receive payment from a vendor for each click on an item profile associated with the particular vendor made by a member of the social network in accordance with one or more embodiments of the invention. This variation extends online advertising systems to e-commerce in a social network. Also, the inquiring member performing the search for an item may be asked whether he/she would like to join a fan group associated with the item. A fan group, as used herein, is a group of members that would like to recommend (and potentially be an advocate for) a particular item. In STEP 325, recommendations for the item are displayed in a manner consistent with STEP 220 of FIG. 2 in accordance with one or more embodiments of the invention.

Figure 4:
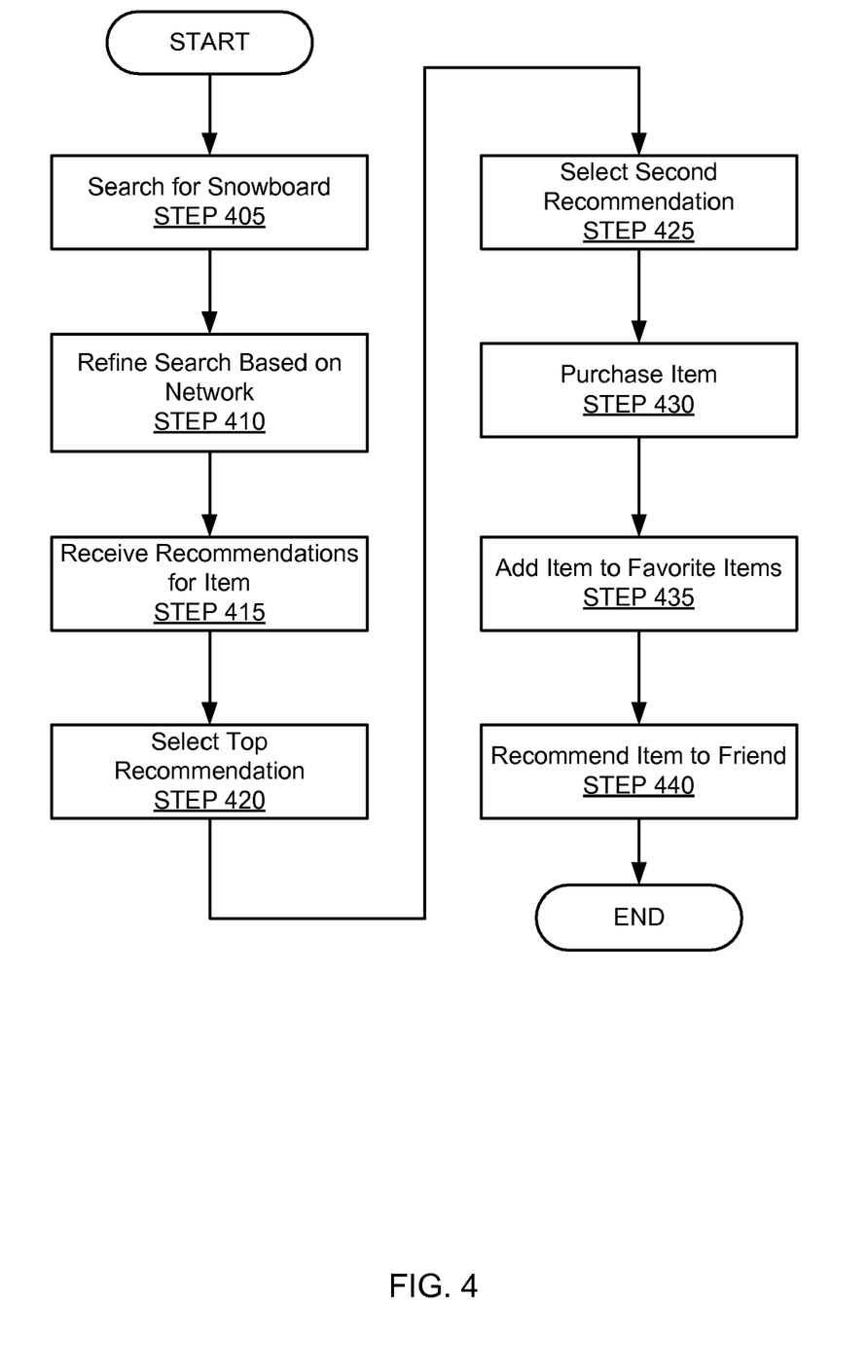
FIGS. 4 and 5 show examples in accordance with one or more embodiments of the invention.
Figure 5:
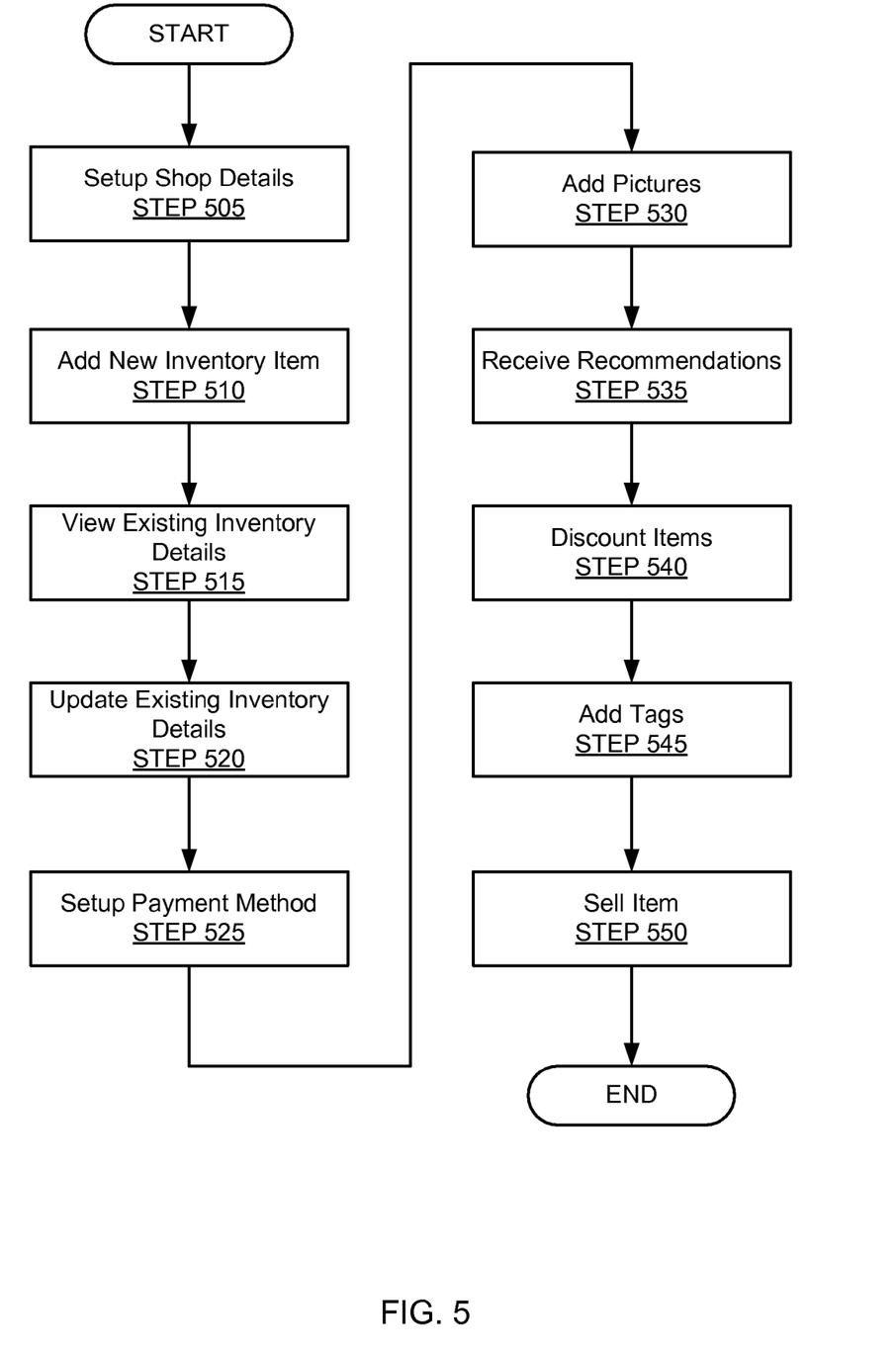

FIG. 4 and FIG. 5 show examples in accordance with one or more embodiments of the invention. Those skilled in the art, having the benefit of this detailed description, will appreciate that the sequence of steps shown in FIGS. 4 and 5 may differ among embodiments of the invention, and that one or more of the steps may be optional.

In FIG. 4, an exemplary purchasing process, in which obtaining a recommendation for a snowboard is demonstrated. This recommendation may be obtained by an inquiring member of a social network, such as Facebook, CafeMom, Faceparty, LinkedIn, MySpace, Twitter, Yelp, or other social networking websites.

In STEP 405, a search for a snowboard is performed in accordance with one or more embodiments of the invention. As described above, a search for the snowboard is generated by a member of the social network. The search may specify search parameters, such as snowboard, exclude non-snowboarders, minimum cost of $100, maximum cost of $400, professional board, size 11, made by Burton, not in California (but in the United States), and possibly other characteristics useful to narrow the search.

In STEP 410, the search is refined based on information maintained by the social network in accordance with one or more embodiments of the invention. Different types of networks may afford various types of recommendations to an inquiring user, thus in order to view different types of recommendations, an inquiring user may opt to refine a search based on particular types of networks. For example, if the inquiring user is searching for recommendations for a snowboard, the user may refine a search to filter out all recommendations by members that do not own snowboards. This fact may be reflected in a member's profile attribute (e.g. snowboarding skill level, inventor list, and/or stored purchase history). In order to gain varying perspectives, an inquiring user may therefore opt to filter recommendations by one or more networks from the search. Further network attributes may be used for filtering, such as location, age, gender, education, and so forth.

In STEP 415, recommendations for an item are received following the processing of the search using the social network. The inquiring member may receive recommendations for an item based on the results of the refined search. Recommendations for an item may include the name of the item, the price of the item, notes about the item written by a recommending member, the network of a recommending member, and so forth. In one or more embodiments of the invention, the recommendations may be arranged in order of ranking previously performed on the ranking separately from the search itself.

In STEP 420, a top (or highest rated) recommendation is selected in accordance with one or more embodiments of the invention. The top recommendation may be selected by the inquiring user or automatically based on user-defined preferences. For example, the top recommendation may be completely based on the location of the person providing the recommending, which is predefined by the user. Or, the top recommendation may be based on the location, gender, and the relationship of the user to the person providing the recommendation. When a recommendation is selected, the system may keep track of information associated with the transaction, such as ranking (in this case first), number of total recommendations, how many times a specific user selects recommendations provided by other members, average recommendation ranking, and the like. This information may be used to fine-tune the system for improved future performance.

In STEP 425, a second (or next highest rated) recommendation is selected in accordance with one or more embodiments of the invention. The second recommendation may again be selected by the inquiring user or automatically based on user-defined preferences. Similarly, the second recommendation selection transaction may be recorded and later mined for data. One skilled in the art will appreciate that while only two recommendations are discussed in this example, the recommendation list may include any number of recommendations and may be ranked in a variety of ways depending on the preferences of the user or default values of the system. Further, any number of recommendations (from zero up to the maximum provided on the recommendation list) may be selected by the inquiring user.

In STEP 430, an item is purchased in accordance with one or more embodiments of the invention. The inquiring member may purchase an item from the recommendation list. Purchasing an item may require purchase information including name, credit card number, address, telephone number, shipping address, and the like. In one or more embodiments of the invention, the purchase information is stored as part of the social network of the inquiring user. Further, the details of the transaction may also be stored as part of the social network.

In STEP 435, the purchased item is added to a favorite items list in accordance with one or more embodiments of the invention. The favorites list may be generated by the inquiring member and contain a number of items that the specified member of the social network purchased, recommended, or likes in general. The favorites list may be set as viewable by everyone, only friends, specified networks, only the inquiring member, and so forth.

In STEP 440, the item is recommended to a friend in accordance with one or more embodiments of the invention. The recommendation may be performed by the inquiring user or by a system where pre-selected members are informed once an item is purchased or identified in some manner from the recommended list. In this way, more recommendations are provided, which enable an increasingly effective recommendation system as more users provide input. A recommendation to a friend may be performed using e-mail, the messaging system of the social network, or another similar mechanism. Additionally, the inquiring user may recommend an item to one or more friends or to the social network as a whole. Those skilled in the art, having the benefit of this detailed description, will appreciate that a recommendation may be made through various mechanisms and to various recipients.

In FIG. 5, an exemplary process from the seller's perspective. Specifically, the process involves setting up inventory for an item, providing a recommendation for that item, and selling the item. This process may be performed by a business or vendor of the item.

In STEP 505, shop details are setup in accordance with one or more embodiments of the invention. The shop details may be setup by a vendor on the social network. Shop details may include the name of the shop, the name of the vendor, networks associated with the vendor, initial items to be included in the shop's inventory, initial prices of initial inventory, and so forth.

In STEP 510, a new inventory item is added to the shop in accordance with one or more embodiments of the invention. The inventory item may be added to the shop by a vendor. Addition of a new item to the shop may include details including the item's name, cost, price, description, comments by the vendor, discount information, quantity, and the like. The item may also be input from an inventory management system external to a recommendation application. The inventory management system may plug into the recommendation application and the social network to provide inventory management capabilities.

In STEP 515, existing inventory details are viewed in accordance with one or more embodiments of the invention. Inventory details (such as the name of the items, their costs, prices, descriptions, quantities, and other details) may be viewed by the vendor. Additionally, a vendor may view inventory management and other reports associated with the shop's inventory. These reports may provide information associated with inventory and sales such as the number of sales in the preceding month, total costs, revenues, profits, customer feedback, and other metrics associated with operations, sales, and inventory management.

In STEP 520, existing inventory details are updated in accordance with one or more embodiments of the invention. These details may be updated by the vendor. Examples of details that may be updated include the name, price, quantity, description, and cost of an item.

In STEP 525, a payment method is setup in the shop in accordance with one or more embodiments of the invention. The payment method may be setup by the vendor of the shop. Payment methods may include credit card, debit card, check, online transfer, electronic payment, and the like. The payment method may be linked to an external application that plugs into a social network and a recommendation application.

In STEP 530, pictures are added to the item profile in accordance with one or more embodiments of the invention. Pictures may be added by the vendor. Pictures may be used to provide a potential customer with more information about the product, and may be annotated with additional details. Additionally, pictures of an item may be tagged within a social network and searchable by users of the social network outside of the shop. This may be an additional marketing channel for the vendor within the social network. Pictures of members of the social network may also be tagged with items. For example, if a member has posted a pictures of him/herself snowboarding, he/she may tag a snowboard visible in the picture. The tag may subsequently lead inquiring members to the shop of a vendor that sells the snowboard.

In STEP 535, recommendations for the item are received in accordance with one or more embodiments of the invention. Recommendations may be received by the vendor, and provided by members of a social network that have examined or bought the item in question. Recommendations may come in the form of a rating (e.g. 1-10, "excellent", "good", "average", "bad"), comments (i.e. a user's experience with the item), and the like. Recommendations may also originate from an external social network through a plug-in with a recommendation application and the current social network.

In STEP 540, prices of items are discounted in accordance with one or more embodiments of the invention. Prices of items may be discounted by the vendor. The discounts of items may be visible to members of the social network (105) immediately, or after a specified time period (e.g. 24 hours after). Discounts may be specified in percentages (e.g. 15% reduction), or in dollar amounts (e.g. $20 reduction). Discounts may also be linked to special promotions (e.g. buy one, get one free). Additionally, a discount in the price of an item may be linked to the cost of the item (e.g. if the cost declines by 10%, the price may be reduced by 5%). This feature may be useful to vendors of items with variable costs. After discounting an item, a news feed associated with the inquiring member may be updated. A news feed is a technology used for providing members with frequently updated content, and may be based on various formats (e.g. RSS, Atom, and other format known to those skilled in the art). In this way, a member interested in a particular item may be alerted to a price change of that item, and may take some action based on that change (e.g. purchase the item when it has been discounted by 20%).

In STEP 545, tags are added to items in accordance with one or more embodiments of the invention. Tags may be added to the items by the vendor of the shop, and may be viewable by members of the social network (105). Tags specify keywords associated with items (e.g. "snowboarding" for a snowboard). As with tags for pictures, tags for items may be searchable across the social network (105) by members of the social network (105). Tags provide for greater ease in reaching potential consumers through the social network (105). An item may have multiple tags assigned to it by a vendor.

In STEP 550, the item is sold in accordance with one or more embodiments of the invention. The item may be sold by the vendor of the shop to an inquiring member of the social network (105). The inquiring member will be required to provide payment information (e.g. payment type, shipping address, email). The sales process may also link to external applications and systems that perform credit card processing, inventory management, shipping, and so forth. Those skilled in the art, having the benefit of this detailed description, will appreciate that there are various mechanisms through which a vendor may sell items to members of a social network.

Figure 6:
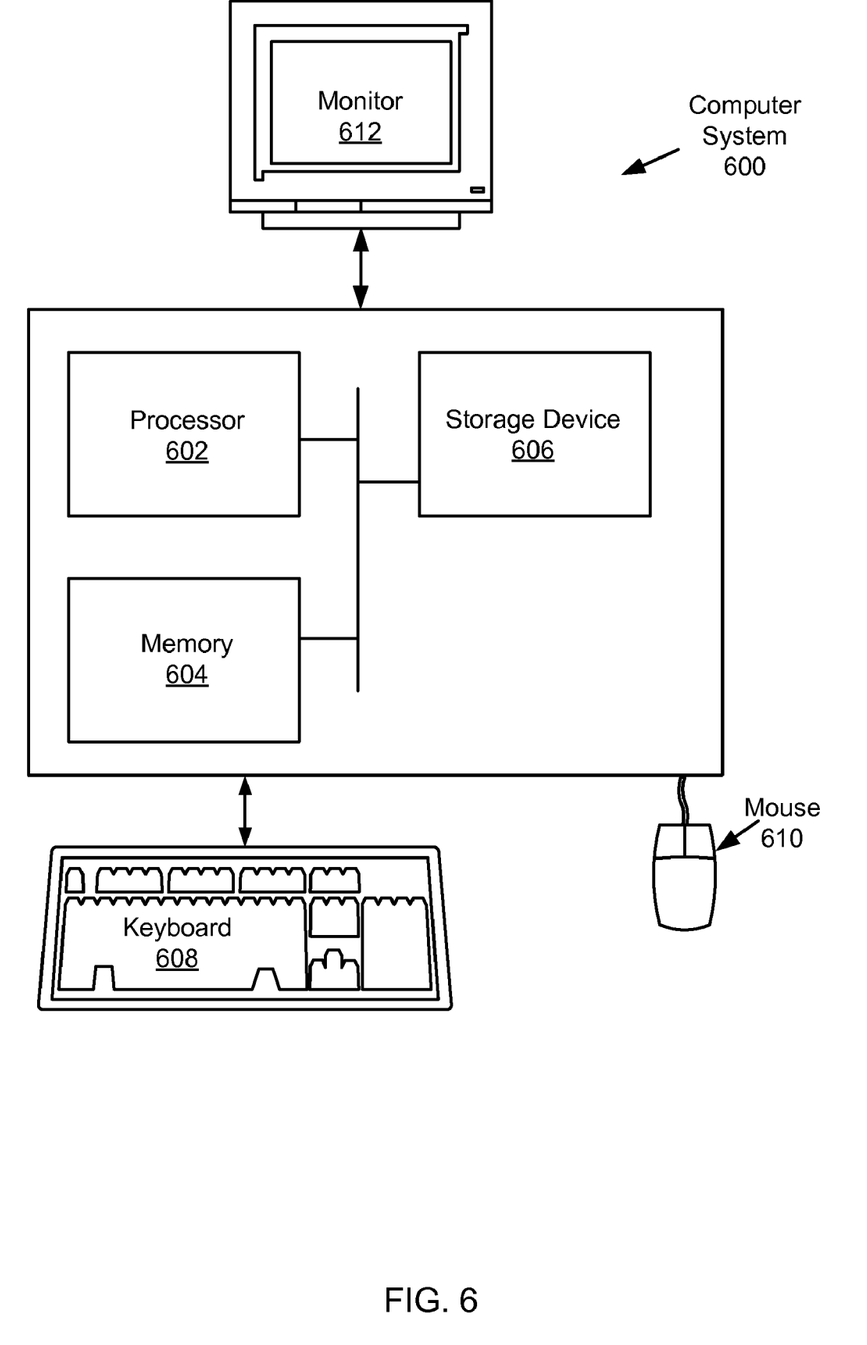
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602), associated memory (604) (e.g., random access memory (RAM), cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer system (600) may also include input means, such as a keyboard (608), a mouse (610), or a microphone (not shown). Further, the computer (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (for example, recommendation application, data repository service, web service, display device driver, and/or any other portion of the invention) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a recommendation list for an item, comprising:
 obtaining a first recommendation for the item from a first member of a social networking utility, wherein the first member of the social networking utility is a friend of an inquiring member within the social networking utility;
 obtaining a second recommendation for the item from a second member of the social networking utility, wherein the second member of the social networking utility is a non-friend of the inquiring member within the social networking utility;
determining, using a processor, a first relationship proximity of the first member with the inquiring member;
determining, using the processor, a second relationship proximity of the second member with the inquiring member;
ranking, using the processor, the first recommendation with a first rank and the second recommendation with a second rank based on the first relationship proximity and the second relationship proximity, wherein the first rank exceeds the second rank;
receiving, from the inquiring member, a request to search for the item in the social networking utility;
performing, based on the request from the inquiring member, a search for the item within the social networking utility;
generating, using the processor, a recommendation list for the item comprising the first recommendation and the second recommendation, wherein the first recommendation is higher on the recommendation list than the second recommendation based on the first rank exceeding the second rank;
determining that the first member comprises a plurality of interests in common with the inquiring member;
determining that a third member of the social networking utility comprises a plurality of different interests than the inquiring member;
comparing the first rank of the first recommendation of the first member with a third rank of a third recommendation of the third member; and
determining that the first rank is higher than the third rank.

2. The method of claim 1, further comprising:
receiving, from the inquiring member, a third recommendation of the item;
and
transmitting the third recommendation of the item to a third member of the social networking utility, wherein the third member of the social networking utility is a third friend of the inquiring member within the social networking utility.

3. The method of claim 1, wherein the relationship proximity of group members of the inquiring member is closer than the relationship proximity of non-group members of the inquiring member, wherein the relationship proximity is closer for friends of the inquiring member, and farther for non-friends to the inquiring member, wherein friends of the inquiring member are within a network of the inquiring member, and wherein non-friends of the inquiring member are outside of the network of the inquiring member.

4. The method of claim 1, further comprising:
receiving a request for a plurality of recommendations associated with a random item of a plurality of items; and
displaying the plurality of recommendations associated with the random item.

5. The method of claim 1, further comprising:
receiving a request to purchase the item; and performing a purchase transaction for the item.

6. The method of claim 1, wherein the search is filtered by a network of the inquiring member.

7. The method of claim 1, further comprising:
identifying a plurality of favorite items of the inquiring member; and
sharing the plurality of favorite items with a network of the inquiring member.

8. The method of claim 1, further comprising:
receiving a plurality of inventory details associated with the item; and
associating the plurality of inventory details with the first recommendation and the second recommendation.

9. The method of claim 8,
wherein the plurality of inventory details is received from an inventory management system.

10. The method of claim 1, further comprising:
generating receiving a plurality of inventory management reports for the item.

11. The method of claim 1, further comprising:
generating a plurality of searchable tags for the item; and
associating the plurality of searchable tags with the item.

12. The method of claim 1, further comprising:
receiving a reduced a price for the item;
modifying a price of the item to the reduced price; and
updating a news feed of the inquiring member to include the reduced price and the price.

13. The method of claim 1, further comprising:
receiving a payment upon a purchase of the item from the inquiring member.

14. The method of claim 1, further comprising:
receiving a payment for each click associated with the item within plurality of items from the social networking utility.

15. The method of claim 1, further comprising:
adding the inquiring member to a fan group associated with the item.

16. A system for generating a recommendation list for an item, comprising:
a processor;
a memory operatively connected to the processor; and
a recommendation application executing on the processor, resident in memory, and configured to:
obtain a first recommendation for the item from a first member of a social networking utility, wherein the first member of the social networking utility is a friend of an inquiring member within the social networking utility;
obtain a second recommendation for the item from a second member of the social networking utility, wherein the second member of the social networking utility is a non-friend of the inquiring member within the social networking utility;
determine a first relationship proximity of the first member with the inquiring member;
determine a second relationship proximity of the second member with the inquiring member;
rank the first recommendation with a first rank and the second recommendation with a second rank based on the first relationship proximity and the second relationship proximity, wherein the first rank exceeds the second rank;
receive, from the inquiring member, a request to search for the item in the social networking utility;
perform, based on the request from the inquiring member, a search for the item within the social networking utility; and
generate a recommendation list for the item comprising the first recommendation and the second recommendation, wherein the first recommendation is higher on the recommendation list than the second recommendation based on the first rank exceeding the second rank;
determine that the first member comprises a plurality of interests in common with the inquiring member;

determine that a third member of the social networking utility comprises a plurality of different interests than the inquiring member;

compare the first rank of the first recommendation of the first member with a third rank of a third recommendation of the third member; and determine that the first rank is higher than the third rank.

17. The system of claim 16, wherein the recommendation application is further configured to obtain a plurality of recommendations from an external social networking utility.

18. The system of claim 16, wherein the recommendation application is further configured to interact with a financial application.

19. The system of claim 16, wherein the recommendation application is further configured to interact with an inventory management application.

20. A non-transitory computer readable storage medium storing instructions to generate a recommendation list for an item, the instructions comprising functionality to:

obtain a first recommendation for the item from a first member of a social networking utility, wherein the first member of the social networking utility is a friend of an inquiring member within the social networking utility;

obtain a second recommendation for the item from a second member of the social networking utility, wherein the second member of the social networking utility is a non-friend of the inquiring member within the social networking utility;

determine a first relationship proximity of the first member with the inquiring member;

determine a second relationship proximity of the second member with the inquiring member;

rank the first recommendation with a first rank and the second recommendation with a second rank based on the first relationship proximity and the second relationship proximity, wherein the first rank exceeds the second rank;

receive, from the inquiring member, a request to search for the item in the social networking utility;

perform, based on the request from the inquiring member, a search for the item within the social networking utility; and generate a recommendation list for the item comprising the first recommendation and the second recommendation, wherein the first recommendation is higher on the recommendation list than the second recommendation based on the first rank exceeding the second rank;

determine that the first member comprises a plurality of interests in common with the inquiring member;

determine that a third member of the social networking utility comprises a plurality of different interests than the inquiring member;

compare the first rank of the first recommendation of the first member with a third rank of a third recommendation of the third member; and determine that the first rank is higher than the third rank.

21. The non-transitory computer readable storage medium of claim 20, the instructions further comprising functionality to:

receive, from the inquiring member, a third recommendation of the item;

and transmit the third recommendation of recommend the item to a third member of the social networking utility, wherein the third member of the social networking utility is a third friend of the inquiring member within the social networking utility.

22. The non-transitory computer readable storage medium of claim 20, the instructions further comprising functionality to:

identify a plurality of favorite items of the inquiring member; and share the plurality of favorite items with a network of the inquiring member.

23. The non-transitory computer readable storage medium of claim 20, the instructions further comprising functionality to:

receive a request to purchase the item; and perform a purchase transaction for the item.

24. The non-transitory computer readable storage medium of claim 20, wherein the search is filtered by a network of the inquiring member.

* * * * *

UNITED STATES PATENT AND TRADEMARK OFFICE
CERTIFICATE OF CORRECTION

| | |
|---|---|
| PATENT NO. | : 8,095,432 B1 |
| APPLICATION NO. | : 12/363629 |
| DATED | : January 10, 2012 |
| INVENTOR(S) | : Kristen K. Berman et al. |

Page 1 of 1

It is certified that error appears in the above-identified patent and that said Letters Patent is hereby corrected as shown below:

In Claim 10, Column 12 (line 10), the word "receiving" should be deleted.

In Claim 12, Column 12 (line 16), replace "a reduced" with --reduced--.

In Claim 14, Column 12 (line 25), the words "plurality of items from" should be deleted.

In Claim 21, Column 14 (line 21), the word "recommend" should be deleted.

Signed and Sealed this
Thirteenth Day of March, 2012

David J. Kappos
*Director of the United States Patent and Trademark Office*